US008213902B2

(12) United States Patent
Rowley

(10) Patent No.: US 8,213,902 B2
(45) Date of Patent: Jul. 3, 2012

(54) SMART CARD ACCESSIBLE OVER A PERSONAL AREA NETWORK

(75) Inventor: Peter A. Rowley, Ben Lomond, CA (US)

(73) Assignee: Red Hat, Inc., Raleigh, NC (US)

(*) Notice: Subject to any disclaimer, the term of this patent is extended or adjusted under 35 U.S.C. 154(b) by 1081 days.

(21) Appl. No.: 11/888,991

(22) Filed: Aug. 2, 2007

(65) Prior Publication Data

US 2009/0036164 A1 Feb. 5, 2009

(51) Int. Cl.
*H04M 3/16* (2006.01)
*G06F 15/16* (2006.01)
*H04K 1/00* (2006.01)

(52) U.S. Cl. ........ 455/411; 455/410; 370/338; 380/247; 380/270; 380/44; 726/4; 726/5; 726/9; 726/10

(58) Field of Classification Search .......... 455/410–411, 455/557, 558; 370/328, 338; 380/44, 270, 380/247; 726/3–10
See application file for complete search history.

(56) References Cited

U.S. PATENT DOCUMENTS

| 4,973,828 | A | 11/1990 | Naruse |
| 5,180,902 | A | 1/1993 | Schick |
| 5,185,798 | A | 2/1993 | Hamada |
| 5,477,215 | A | 12/1995 | Mandelbaum |
| 5,521,966 | A | 5/1996 | Friedes |
| 5,859,419 | A | 1/1999 | Wynn |
| 6,036,100 | A | 3/2000 | Asami |
| 6,089,451 | A | 7/2000 | Krause |
| 6,157,966 | A | 12/2000 | Montgomery |
| 6,257,486 | B1 | 7/2001 | Teicher |
| 6,439,464 | B1 | 8/2002 | Fruhauf |
| 2004/0255137 | A1* | 12/2004 | Ying ............................. 713/193 |
| 2007/0167151 | A1* | 7/2007 | Zinn et al. ..................... 455/411 |
| 2007/0286376 | A1* | 12/2007 | Maximo et al. .......... 379/201.01 |
| 2008/0098225 | A1* | 4/2008 | Baysinger ..................... 713/171 |
| 2008/0212771 | A1* | 9/2008 | Hauser ............................ 380/44 |
| 2009/0059874 | A1* | 3/2009 | Carter ........................... 370/338 |
| 2010/0241867 | A1* | 9/2010 | Brown et al. ................. 713/185 |

FOREIGN PATENT DOCUMENTS

| EP | 0 949 593 | 10/1999 |
| JP | 63168755 | 7/2088 |

OTHER PUBLICATIONS

Bluetooth, from Wikipedia. http://en.wikipedia.org/wiki/Bluetooth. Jun. 26, 2007. 13 pgs.
Tech FAQ, "What is ISO 7816?," http://www.tech-faq.com/iso-7816. shtml, Jun. 26, 2007 4 pgs.
CardWerk, "ISO 7816-4: Interindustry Commands for Interchange, Section 2: Normative References." SmartCardSupply.com, "ISO 7816 Standard Overview," http://www.cardsupply.com/Content/Cards/7816standard.htm, Jun. 26, 2007, 24 pgs.
Smart Card Basics, "Smart Card Standards," http://www.cardcardbasics.com/standards.html, Jun. 26, 2007, 3 pgs.

* cited by examiner

*Primary Examiner* — Marcos Torres
(74) *Attorney, Agent, or Firm* — Lowenstein Sandler PC

(57) ABSTRACT

Some embodiments of a smart card accessible over a personal area network have been presented. In one embodiment, an apparatus includes a wireless transceiver to communicatively couple to a personal area network (PAN) to receive an authentication request via the PAN from a device. The device may include a computer. The apparatus further includes a storage device to store a digital certificate that uniquely identifies a user. An authentication module in the apparatus may authenticate the user in response to an authentication request from the device using the digital certificate, wherein the user is allowed to access the computer upon authentication.

22 Claims, 6 Drawing Sheets

SMART CARD ACCESSIBLE OVER A PERSONAL AREA NETWORK

TECHNICAL FIELD

Embodiments of the present invention relate to smart cards, and more specifically to making smart cards accessible over wireless personal area networks.

BACKGROUND

Today, the use of smart card has become more and more common in everyday life. For example, many credit cards, debit cards, identification cards, insurance cards, etc. are made of smart cards. In general, many conventional smart cards include storage media and processing modules, and thus, are more useful and powerful than cards having conventional magnetic strips. Some conventional smart cards provide digital certificates to allow users to authenticate themselves in order to access their financial accounts, healthcare records, etc. Typically, a smart card has to be physically coupled to a smart card reader (e.g., inserted into, or put onto), which is a dedicated device for communicating with smart cards. The smart card reader may be further connected to a computer, a workstation, a special-purpose machine (e.g., a cash register), etc., which may communicate with the smart card via the smart card reader.

One problem with the above system is the need of the smart card reader. In order to enable a computer to communicate with smart cards, one has to spend extra money to purchase the smart card reader. For an entity (e.g., a company, a library, etc.) that has many computers, it may become costly to purchase a smart card reader for every computer.

The above system also suffers from a potential security loophole. Users often forget to remove their smart cards when they leave the computer. Conventional smart card readers typically do not remind users to remove their cards when they are done. As a result, a user may leave his smart card in the smart card reader inadvertently and an unauthorized individual may use the smart card left behind to log onto the computer. This poses a security threat to the entire system.

DESCRIPTION OF THE DRAWINGS

The present invention is illustrated by way of example, and not by way of limitation, in the figures of the accompanying drawings and in which.

DETAILED DESCRIPTION

Figure 1A:
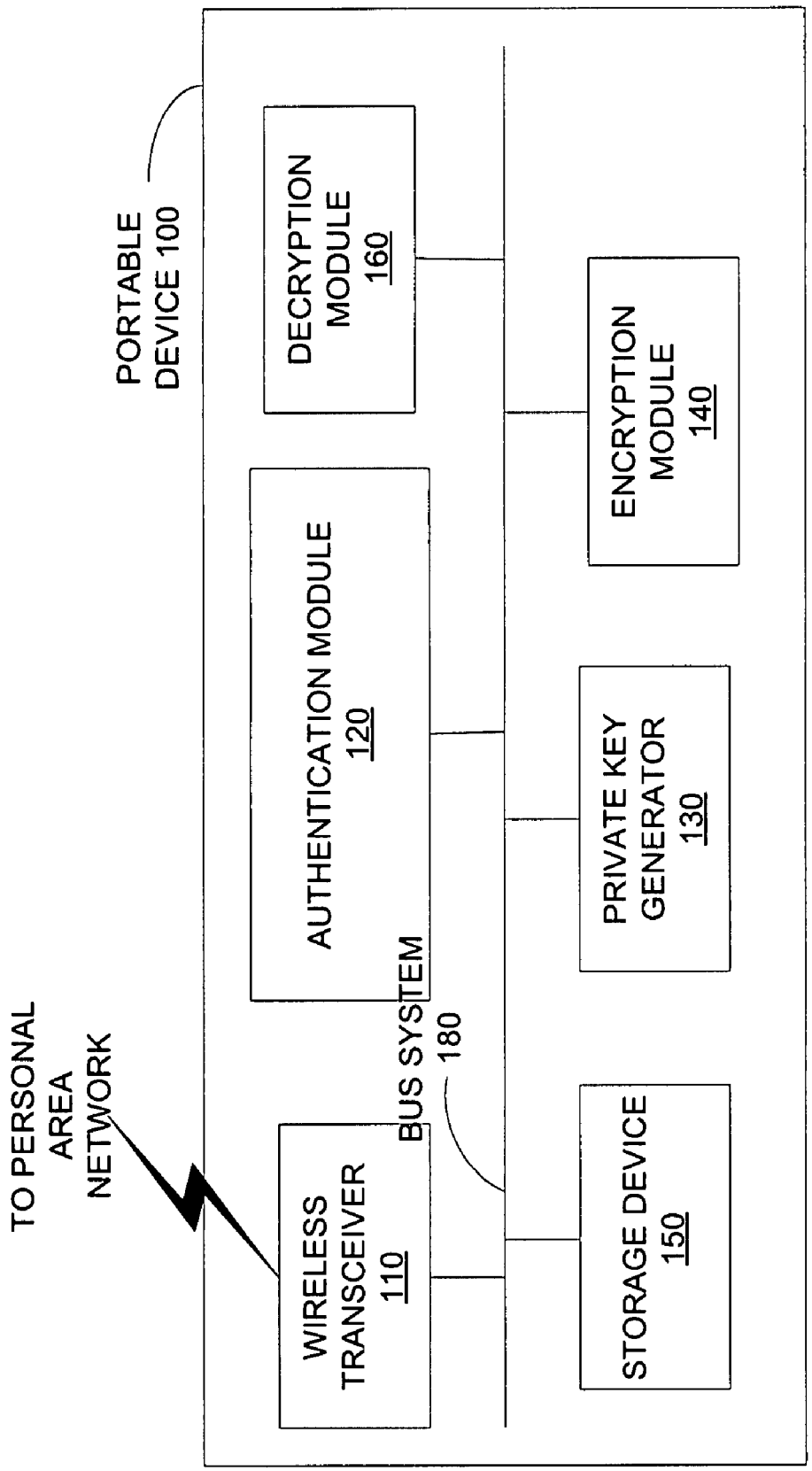
FIG. 1A illustrates one embodiment of a portable device in which embodiments of the present invention may be implemented.

Described herein are some embodiments of a smart card accessible over a personal area network. In one embodiment, a smart card includes a wireless transceiver to communicatively couple to a personal area network (PAN) to receive an authentication request via the PAN from a computer. The smart card further includes a storage device to store a digital certificate that uniquely identifies a user. An authentication module in the smart card may authenticate the user in response to an authentication request from the computer using the digital certificate, wherein the user is allowed to access the computer upon authentication (e.g., the user is automatically logged onto the computer upon authentication). In some embodiments, the smart card is implemented on a portable device, such as a cellular telephone, a personal digital assistant, etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1B:
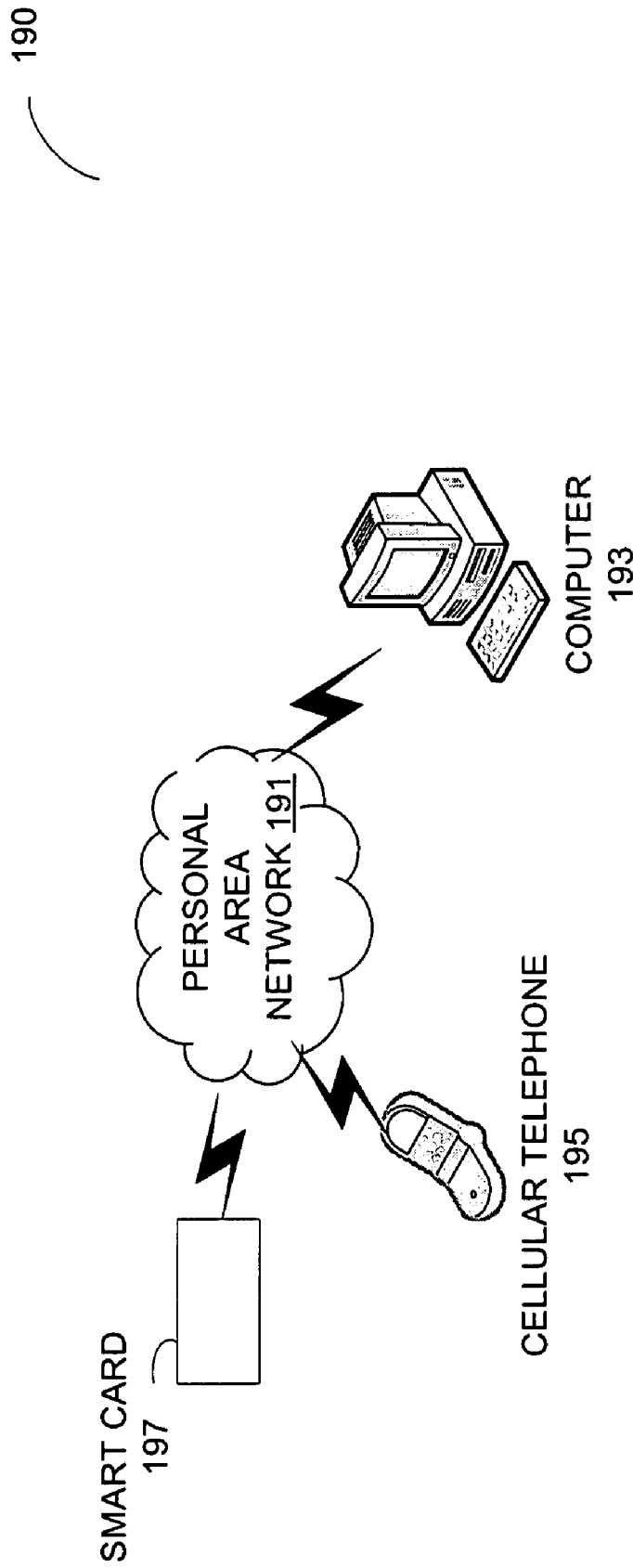
FIG. 1B illustrates one embodiment of a system in which embodiments of the present invention may be implemented.

FIG. 1A illustrates one embodiment of a portable device in which embodiments of the present invention may be implemented. The portable device 100 may be a smart card. Alternatively, the portable device 100 may be a cellular telephone, a personal digital assistant (PDA), etc. The portable device 100 includes a wireless transceiver 110, an authentication module 120, a private key generator 130, an encryption module 140, a storage device 150, and a decryption module 160, which are coupled to each other via a bus system 180. The wireless transceiver 110 is operable to communicatively couple to a wireless personal area network (PAN). One example of the wireless transceiver 110 is a radio frequency (RF) transceiver. A PAN in general refers to a computer network for computer and/or other electronic devices (e.g., cellular telephones, PDAs, smart cards, etc.) close to a person to communicate with each other. The PAN may adopt one of various short-range communication protocols or standards, such as Bluetooth™, IrDA (Infrared Data Association) specification, ultra-wideband (UWB) standard, etc. For example, the PAN may be implemented using Bluetooth™ technology, where the PAN includes a master device and a number of slave devices. In one embodiment, the PAN includes a computer (e.g., a desktop computer, a laptop computer, etc.) acting as a master device and up to seven slave devices (e.g., cellular telephones, PDAs, wireless mouse, etc.). The range of a PAN is typically a few meters. Thus, an electronic device in the PAN may be communicatively decoupled from the PAN if the electronic device is physically moved away from the master device of the PAN beyond a predetermined distance. An exemplary embodiment of a system having a PAN is shown in FIG. 1B as discussed below.

Referring back to FIG. 1A, the wireless transceiver 110 may detect the PAN and other devices communicatively coupled to the PAN when the wireless transceiver 110 is within a predetermined physical range of the PAN. The wireless transceiver 110 may include a radio frequency (RF) transceiver, such as a Bluetooth™ transceiver.

Once the wireless transceiver 110 establishes communication with the PAN according to the communication protocol of the PAN, the wireless transceiver 110 may receive an authentication request from another device in the PAN (e.g., the master device in the PAN). For the following discussion, the authentication request is from a computer acting as a master device in the PAN. The wireless transceiver 110 forwards the authentication request to the authentication module 120. The authentication module 120 may retrieve a digital certificate of a user from the storage device 150 in response to the authentication request. Using the digital certificate retrieved, the authentication module 120 may authenticate the user to the master device. Note that the digital certificate uniquely identifies the user who is a person, and thus, may function as a personal identification (ID) of the user. Thus, for security reason, the digital certificate is protected from being extracted from the portable device 100. For example, the portable device 100 may allow only use of the digital certificate internal to the portable device 100. The portable device 100 may not allow transmission of the digital certificate to any external device. Upon successful authentication, the master device may automatically allow the user to log on. However, the portable device 100 may be communicatively decoupled from the PAN when the portable device 100 is physically moved away from the master device beyond a predetermined distance. Thus, when the user carrying the portable device 100 moves away from the computer beyond the predetermined distance, the master device may detect a loss of signal from the portable device 100. In response to detecting the loss of signal from the portable device 100 for over the predetermined time period, the computer may conclude that the user has left the room housing the computer. To protect the user's computer account from unauthorized access, the computer may automatically log off the user then. For example, the user may leave the computer and forget to log off. If the portable device 100 is a personal portable device (e.g., cellular telephone, PDAs, etc.), then the user typically carries the personal portable device on his person (e.g., in a pocket of the clothing of the user). Thus, the portable device 100 would be moved away from the computer as the person leaves the computer. When the portable device 100 is far enough from the computer, the portable device would be communicatively decoupled from the PAN. As such, the computer may automatically log off the user after the portable device 100 is communicatively decoupled from the PAN for the predetermined time period.

Furthermore, many computers (both desktop computers and laptop computers) have been pre-installed with a wireless transceiver compatible with one or more communication protocols for PAN. Thus, there is no need to purchase a separate device reader for each computer in order to communicate with the portable device 100.

In addition to the above advantages, storing the digital certificate on the portable device 100 also makes the digital certificate portable, and hence, easier to use. Since the digital certificate is being carried on the portable device 100, which may wirelessly access the PAN via the wireless transceiver 110, the user may use the digital certificate on computers that can wirelessly communicate with the portable device 100. Unlike many conventional systems, where the digital certificate is installed in a single computer and thus, usable with the single computer only, the user is not limited to using the digital certificate with a single computer. Furthermore, the user may not have to carry any extra portable devices (e.g., keys, fobs, etc.) if the portable device 100 is implemented on a commonly used portable device, such as a cellular phone.

In addition to securely automating the user log-on and log-off process, the portable device 100 may perform other transactions with the computer using the digital certificate and/or a private key of the user, such as signing electronic mail (email), encrypting messages and/or documents, decrypting messages and/or documents, etc. In some embodiments, the private key generator 130 in the portable device 100 generates a private key for the user. The private key may also be stored in the storage device 150. Using the private key, the encryption module 140 may encrypt documents (e.g., email) in response to an encryption request from the computer. Likewise, the decryption module 160 may decrypt documents in response to a decryption request from the computer. Details of some embodiments of encryption and decryption of documents are discussed below.

FIG. 1B illustrates one embodiment of a system in which embodiments of the present invention may be implemented. The system 190 includes a PAN 191, a computer 193, a cellular telephone 195, and a smart card 197. The PAN 191 may be established according to Bluetooth™ protocol. The computer 193 may act as a master device in the PAN 191, whereas the cellular telephone 195 and the smart card 197 act as slave devices in the PAN 191. The portable device 100 in FIG. 1A may be implemented in the cellular telephone 195 and/or the smart card 197. Thus, a user of the cellular telephone 195 and/or the smart card 197 may log onto the computer 193 using the digital certificate in the cellular telephone 195 and/or the smart card 197 as discussed above. While logged onto one's account, the user may further use the digital certificate and/or a private key in the cellular phone 195 and/or the smart card 197 to perform other tasks, such as encrypting and decrypting messages from the computer 193.

Note that any or all of the components and the associated hardware illustrated in FIG. 1B may be used in various embodiments of the system 190. However, it should be appreciated that other configurations of the system 190 may include more or fewer devices than those shown in FIG. 1B. For example, there may be additional slave devices coupled to the PAN 191 than those shown in FIG. 1B.

Figure 2A:
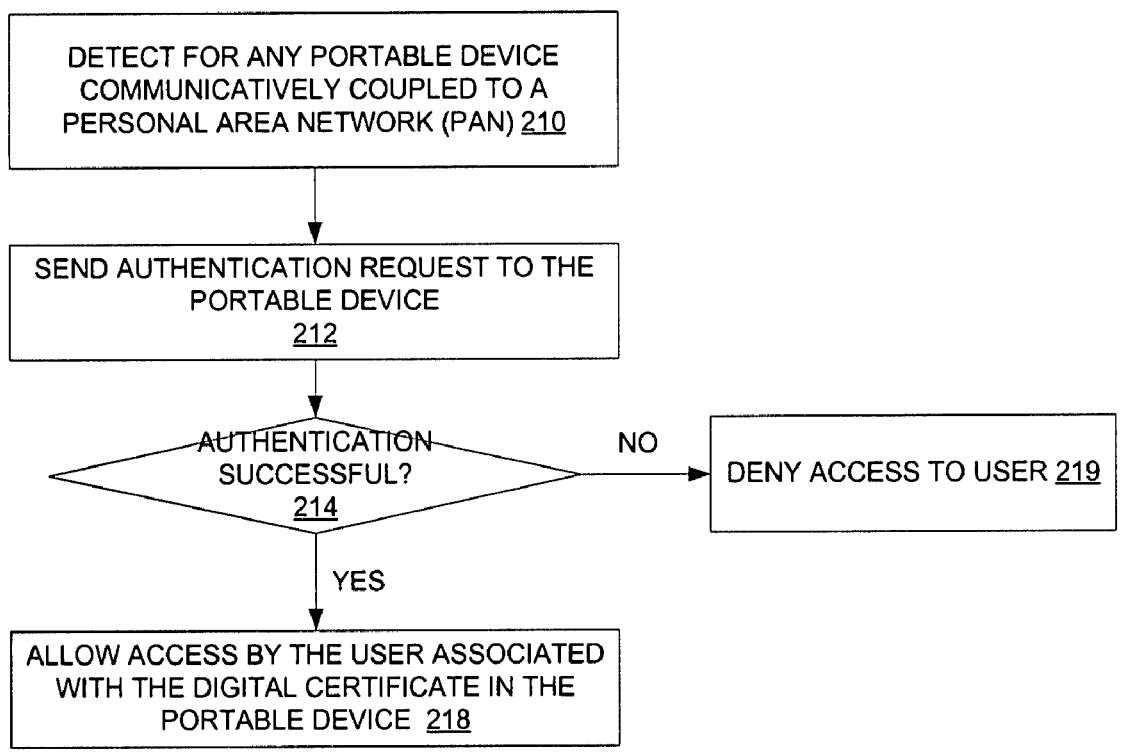
FIG. 2A illustrates a flow diagram of one embodiment of a process to authenticate a user.

FIG. 2A illustrates a flow diagram of one embodiment of a process to authenticate a user. The process may be performed by processing logic that may comprise hardware (e.g., circuitry, dedicated logic, programmable logic, microcode, etc.), software (such as instructions run on a processing device), firmware, or a combination thereof. For example, the computer 193 in FIG. 1B may perform at least part of the process.

Referring to FIG. 2A, processing logic searches for any portable device communicatively coupled to a PAN (processing block 210). For example, processing logic may send signals to scan for devices in the PAN. A portable device, such as the portable device 100 shown in FIG. 1A, may wirelessly transmit signals identifying itself to other devices coupled to the PAN, and such signals may be picked up by processing logic during the scan. Processing logic thus detects the portable device. Then processing logic sends an authentication request to the portable device (processing block 212). In response to the authentication request, the portable device may perform authentication using a digital certificate stored in the portable device as discussed above. Processing logic checks if authentication is successful (processing block 214). If authentication is successful, then processing logic allows access by a user associated with the digital certificate in the portable device (processing block 218). For example, the user may be allowed to log onto his account and perform operations allowable under some predetermined privileges of the account. For example, if the account is an administrator account, the user is allowed to perform administrative operations after logging onto his account. Otherwise, if authentication fails, processing logic denies access to the user (processing block 219).

Figure 2B:
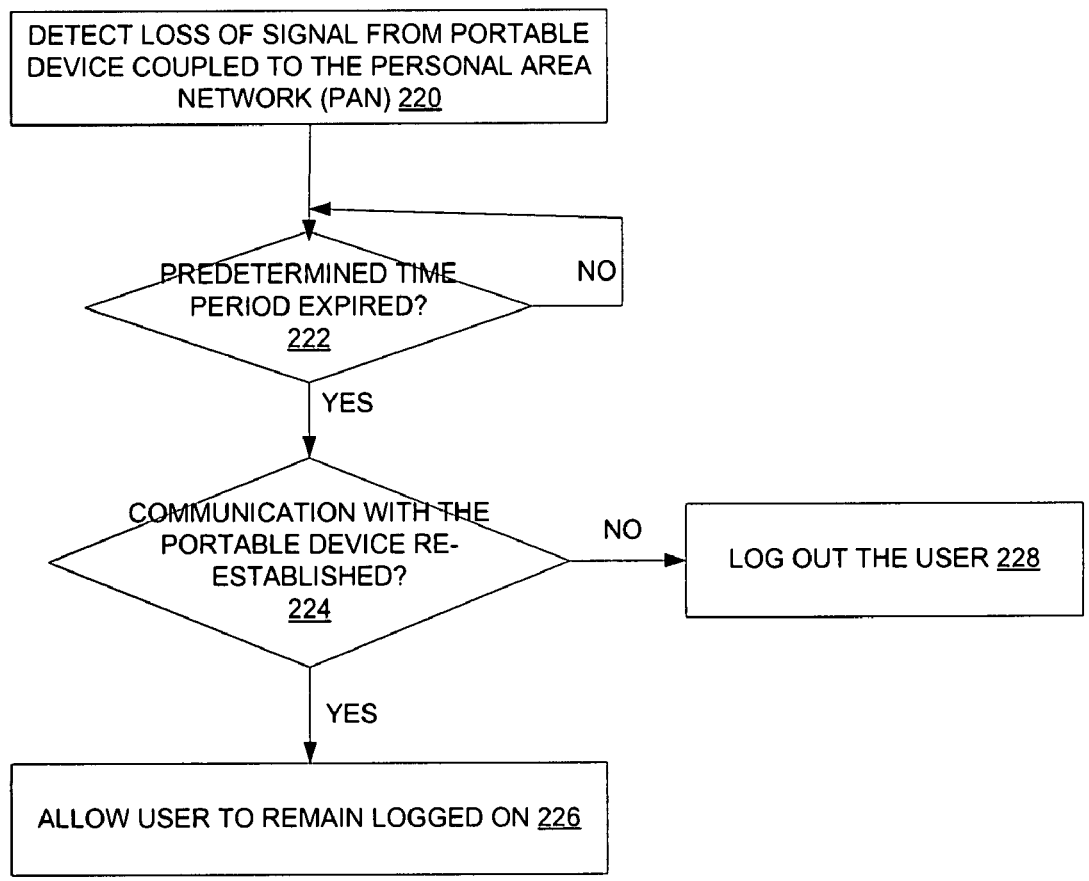
FIG. 2B illustrates a flow diagram of one embodiment of a process to automatically log off a user.

FIG. 2B illustrates a flow diagram of one embodiment of a process to automatically log off the user. The process may be performed by processing logic that may comprise hardware (e.g., circuitry, dedicated logic, programmable logic, microcode, etc.), software (such as instructions run on a processing device), firmware, or a combination thereof. For example, the computer 193 in FIG. 1B may perform the process.

Referring to FIG. 2B, processing logic detects a loss of signal from the portable device over the PAN (processing block 220). Then processing logic checks if a predetermined time period has expired yet (processing block 222). If the predetermined time period has not yet expired, then processing logic remains in processing block 222. Otherwise, if the predetermined time period has expired, then processing logic checks if the communication with the portable device has been re-established (processing block 224). If the communication with the portable device has been re-established, then processing logic allows the user to remain logged on (processing block 226). Otherwise, if the communication with the portable device has not been re-established, then processing logic logs out the user (processing block 228). For example, processing logic may terminate the current transaction and/or session the user has been in. In addition to logging in and logging out users, the portable device 100 may be used to perform other tasks in cooperation with the computer in the PAN. One example of such tasks is discussed in details with reference to FIG. 3 below.

Figure 3:
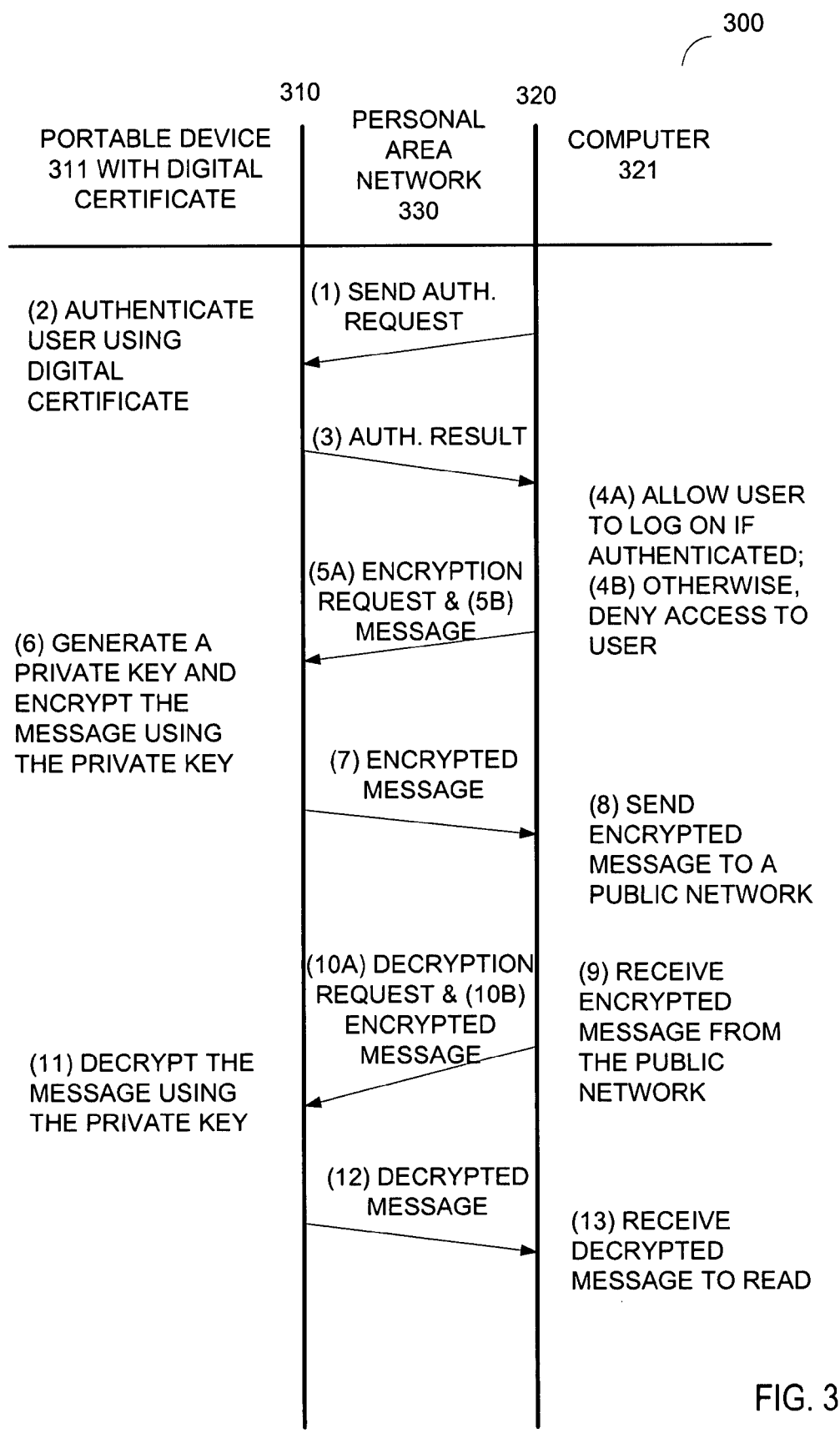
FIG. 3 illustrates one embodiment of a call diagram of a process to encrypt and/or decrypt messages.

FIG. 3 illustrates one embodiment of a call diagram of a process to encrypt and/or decrypt messages. In the call diagram 300, transactions are performed between a portable device 311 and a computer 321, which communicate wirelessly via a PAN 330. Operations shown to the left of line 310 are performed at the portable device 311, and operations shown to the right of line 320 are performed at the computer 321. Communications between the portable device 311 and the computer 321 via the PAN 330 are shown between the lines 310 and 320.

In some embodiments, the computer 321 sends an authentication request (1) to the portable device to try to authenticate a user. In response to the authentication request (1), the portable device 311 authenticates the user using a digital certificate stored in the portable device 311 (2). Then the portable device 311 sends the authentication result (3) back to the computer 321. If the authentication has been successful, then the computer 321 allows the user to log on (4A). Otherwise, the computer 321 denies access to the user (4B).

In the following discussion, suppose the user has been authenticated successfully and the computer 321 has allowed the user to log on. While being logged onto the computer 321, the user may desire to send an encrypted message via electronic mail to a public network (e.g., the Internet). The message may be encrypted in the following manner. In some embodiments, the computer 321 sends an encryption request (5A) and the message (5B) to the portable device 311. In response to the encryption request (5A), the portable device may generate a private key for the user and encrypt the message (5B) using the private key (6). Then the private key generated may be stored in the portable device 311. Alternatively, the portable device 311 may retrieve a previously generated private key for the user and encrypt the message (5B) using this private key. Note that this previously generated private key may be generated by the portable device 311 or by another device (e.g., another computer, a server, a dedicated device, etc.) and then loaded onto the portable device 311. Then the portable device may send the encrypted message (7) to the computer 321. Then the computer 321 sends the encrypted message to the public network (8).

In addition to encrypting messages, the portable device 311 may decrypt messages for the computer 321. In some embodiments, the computer 321 receives an encrypted message from the public network (9). The computer 321 sends a decryption request (10A) and the encrypted message (10B) to the portable device 311. In response to the decryption request (10A), the portable device 311 retrieved the private key to decrypt the encrypted message (10B). After decrypting the message (10B), the portable device 311 sends the decrypted message (12) to the computer 321. Then the computer 321 receives the decrypted message to read (13).

Since the digital certificate used in authenticating the user and the private key used in encryption and decryption are stored in the portable device 311, the user may conveniently carry the digital certificate and the private key in the portable device 311 wherever the user goes, thus, allowing the user to use the digital certificate and the private key on different computers. Furthermore, the portable device 311 may be implemented on a device that is usually carried on the person by the user, such as a cellular telephone, a PDA, etc. Thus, the user does not have to carry an extra device (e.g., a card, a fob, etc.).

Figure 4:
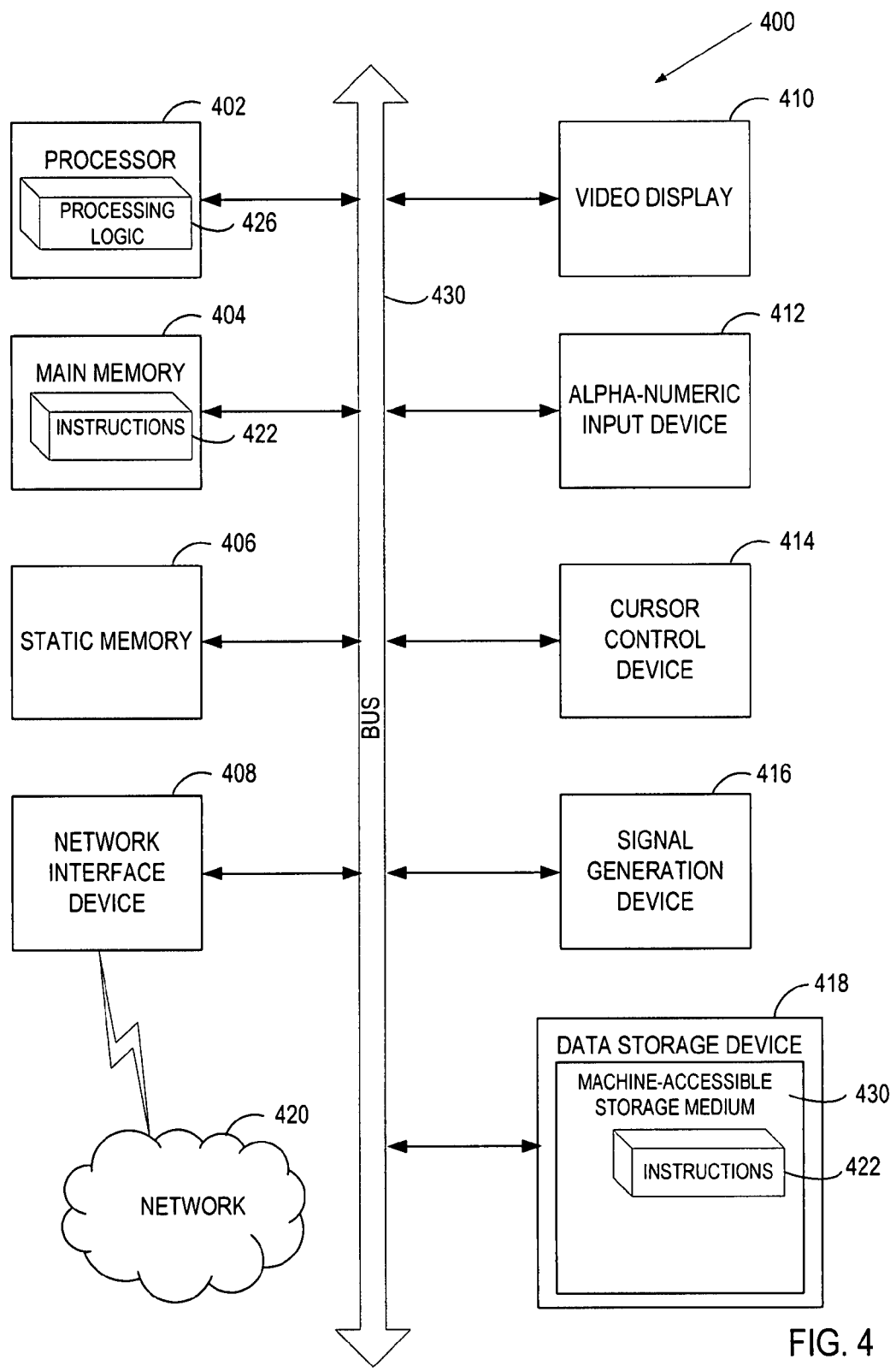
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a smart card accessible over a PAN have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
    a wireless transceiver to communicatively couple to personal area networks (PANs);
    a storage device, coupled to the wireless transceiver, to store a digital certificate that uniquely identifies a user;
    an authentication module, coupled to the wireless transceiver, to automatically log the user on to a first device within a first PAN using the digital certificate in response to the wireless transceiver communicatively coupling to the first PAN, and to automatically log the user on to a second device within a second PAN using the digital certificate in response to the wireless transceiver communicatively coupling to the second PAN; and
    an encryption module, coupled to the wireless transceiver, to provide an encryption service for the first device after the user is logged on to the first device, wherein providing the encryption service comprises receiving an encryption request from the first device, the encryption request comprising a message to be encrypted, encrypting the message using a private key associated with the user, and causing the wireless transceiver to send the encrypted message to the first device, wherein the first device transmits the encrypted message to a remote recipient without decrypting the encrypted message.

2. The apparatus of claim 1, further comprising:
    a security management module to generate the private key for the user.

3. The apparatus of claim 1, wherein the first device comprises a computer and the user is automatically logged off from the computer if the wireless transceiver has been communicatively decoupled from the first PAN for a predetermined period.

4. The apparatus of claim 1, wherein the wireless transceiver, the storage device, the authentication module and the encryption module reside within a cellular telephone.

5. The apparatus of claim 1, wherein the wireless transceiver, the storage device, the authentication module and the encryption module reside within a smartcard.

6. The apparatus of claim 1, wherein the wireless transceiver includes a radio frequency (RF) transceiver.

7. The apparatus of claim 1, wherein the digital certificate is protected from being extracted by devices external to the apparatus.

8. A system comprising the apparatus of claim 1, further comprising a personal computer communicatively coupled to the apparatus via the first PAN, wherein the personal computer allows access by the user if the user is authenticated using the apparatus.

9. A method comprising:
wirelessly communicatively coupling a portable device to at least one of a first personal area network (PAN) or a second PAN using a wireless transceiver of the portable device;
storing a digital certificate, which uniquely identifies a user, in the portable device;
using the digital certificate, automatically logging the user on to a first device within the first PAN in response to the wireless transceiver communicatively coupling to the first PAN, and automatically logging the user on to a second device within the second PAN in response to the wireless transceiver communicatively coupling to the second PAN; and
providing an encryption service for the first device after the user is logged on to the first device, wherein providing the encryption service comprises:
receiving an encryption request from the first device, the encryption request comprising a message to be encrypted;
encrypting the message using a private key associated with the user; and
wirelessly sending the encrypted message to the first device via the first PAN, wherein the first device transmits the encrypted message to a remote recipient without decrypting the encrypted message.

10. The method of claim 9, further comprising:
generating the private key for the user in the portable device.

11. The method of claim 9, further comprising:
causing the user to be automatically logged off from the first device if the portable device has been communicatively decoupled from the first PAN after a predetermined period of time.

12. The method of claim 9, wherein the portable device comprises a cellular telephone.

13. The method of claim 9, wherein the portable device comprises a smart card.

14. The method of claim 9, wherein wirelessly communicatively coupling the portable device to at least one of the first PAN or the second PAN comprises:
transmitting radio frequency (RF) signals between the portable device and at least one of the first PAN or the second PAN.

15. The method of claim 9, further comprising:
preventing the digital certificate from being extracted from the portable device.

16. A non-transitory machine-readable medium that provides instructions that, when executed by a processor, will cause the processor to perform operations comprising:
wirelessly communicatively coupling a portable device to at least one of a first personal area network (PAN) or a second PAN using a wireless transceiver of the portable device;
storing a digital certificate, which uniquely identifies a user, in the portable device;
using the digital certificate, automatically logging the user on to a first device within the first PAN in response to the wireless transceiver communicatively coupling to the first PAN, and automatically logging the user on to a second device within the second PAN in response to the wireless transceiver communicatively coupling to the second PAN; and
providing an encryption service for the first device after the user is logged on to the first device, wherein providing the encryption service comprises:
receiving an encryption request from the first device, the encryption request comprising a message to be encrypted;
encrypting the message using a private key associated with the user; and
wirelessly sending the encrypted message to the first device via the first PAN, wherein the first device transmits the encrypted message to a remote recipient without decrypting the encrypted message.

17. The non-transitory machine-readable medium of claim 16, the operations further comprising:
generating the private key for the user in the portable device.

18. The non-transitory machine-readable medium of claim 16, further comprising:
causing the user to be automatically logged off from the first device within the first PAN if the portable device has been communicatively decoupled from the first PAN after a predetermined period of time.

19. The non-transitory machine-readable medium of claim 16, wherein the portable device comprises a cellular telephone.

20. The non-transitory machine-readable medium of claim 16, wherein the portable device comprises a smart card.

21. The non-transitory machine-readable medium of claim 16, wherein wirelessly communicatively coupling the portable device to the PANs comprises:
transmitting radio frequency (RF) signals between the portable device and the PANs.

22. The non-transitory machine-readable medium of claim 16, the operations further comprising:
preventing the digital certificate from being extracted from the portable device.

* * * * *